United States Patent
Gulizia et al.

(10) Patent No.: US 11,034,098 B2
(45) Date of Patent: Jun. 15, 2021

(54) FORMATION, REPAIR AND MODIFICATION OF LAY UP TOOLS

(71) Applicant: Commonwealth Scientific and Industrial Research Organisation, Campbell (AU)

(72) Inventors: Stefan Gulizia, Clayton (AU); Mahnaz Jahedi, Clayton (AU); Chull Hee Oh, Clayton (AU); Enzo Luccio Stefano Salvatore Gulizia, Clayton (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 157 days.

(21) Appl. No.: 16/001,232

(22) Filed: Jun. 6, 2018

(65) Prior Publication Data
US 2018/0281317 A1    Oct. 4, 2018

Related U.S. Application Data

(62) Division of application No. 14/414,534, filed as application No. PCT/AU2013/000920 on Aug. 20, 2013.

(30) Foreign Application Priority Data

Aug. 20, 2012   (AU) ................. 2012903586
Aug. 20, 2012   (AU) ................. 2012903587
Aug. 20, 2012   (AU) ................. 2012903588

(51) Int. Cl.
   *B29C 59/16*   (2006.01)
   *B29C 70/30*   (2006.01)
   (Continued)

(52) U.S. Cl.
   CPC ........... *B29C 70/30* (2013.01); *B05D 1/12* (2013.01); *B29C 33/38* (2013.01); *B29C 33/56* (2013.01);
   (Continued)

(58) Field of Classification Search
   CPC ....... B29C 70/30; B29C 70/305; B29C 59/00; B29C 59/02; B29C 59/026; B29C 2059/023; B29C 59/14; B29C 59/16
   (Continued)

(56) References Cited

U.S. PATENT DOCUMENTS 4,619,580 A  * 10/1986 Snyder .................. F01D 5/148
                                                    415/12
5,302,414 A     4/1994 Alkhimov et al.
(Continued)

FOREIGN PATENT DOCUMENTS

CA         1060279       8/1979
WO    2008059272 A2     5/2008
(Continued)

OTHER PUBLICATIONS

Extended European Search Report dated Jan. 12, 2017 for corresponding EP Application No. 17187036.3.
(Continued)

*Primary Examiner* — Thu Khanh T Nguyen
(74) *Attorney, Agent, or Firm* — Tarolli, Sundheim, Covell & Tummino LLP

(57) ABSTRACT

A composite lay up tool comprising a metal faceplate (12) on a support member (13), wherein the faceplate has been formed by cold-gas dynamic spraying of particles of the metal onto a substrate and wherein the support member is compatible with the faceplate and comprises a casting of a ceramic composition. A process for forming the tool is disclosed. In one aspect, a castable ceramic composition
(Continued)

comprises a binder and an aggregate component mixable with water to form a slurry ready for casting, wherein the aggregate component is one of, or a mixture of, fused silica and a particulate metal alloy, and the binder and aggregate component are present in the proportions 10-50 wt % and 90-50 wt % based on the dry weight of the composition. Also disclosed is a process for producing a faceplate for a lay up tool, which process comprises cold-gas dynamic spraying of particles of a nickel-iron alloy onto a substrate to form a faceplate of the nickel-iron alloy on the substrate, the faceplate being of a thickness in the range 2 to 10 mm. Further disclosed is a process for depositing a metal on a faceplate of a lay up tool in which the faceplate is formed of a nickel-iron alloy, which process comprises preparing an area of a surface of the faceplate to effect cleaning and conditioning of the area to accept and adhere to cold-gas dynamic sprayed particles, and cold-gas dynamic spraying particles of the metal onto the cleaned and conditioned area, wherein the metal is a nickel-iron alloy selected to be compatible with the faceplate.

7 Claims, 5 Drawing Sheets

(51) Int. Cl.
| | | |
|---|---|---|
| *B29C 33/38* | (2006.01) | |
| *B29C 33/56* | (2006.01) | |
| *C23C 24/04* | (2006.01) | |
| *B05D 1/12* | (2006.01) | |
| *C22C 38/02* | (2006.01) | |
| *C22C 38/04* | (2006.01) | |
| *C22C 38/08* | (2006.01) | |
| *B29L 31/28* | (2006.01) | |

(52) U.S. Cl.
CPC .............. *C22C 38/02* (2013.01); *C22C 38/04* (2013.01); *C22C 38/08* (2013.01); *C23C 24/04* (2013.01); *B29L 2031/28* (2013.01)

(58) Field of Classification Search
USPC ............... 264/40.1, 139, 155, 156, 169, 238
See application file for complete search history.

(56) References Cited

U.S. PATENT DOCUMENTS

| | | |
|---|---|---|
| 6,749,002 B2 | 6/2004 | Grinberg et al. |
| 6,759,002 B1 | 7/2004 | Engwall et al. |
| 6,759,085 B2 | 7/2004 | Muehlberger |
| 6,905,728 B1 * | 6/2005 | Hu .......................... B22F 7/08 427/140 |
| 7,141,191 B2 | 11/2006 | Engwall et al. |
| 2007/0215677 A1 | 9/2007 | Floyd et al. |
| 2007/0281176 A1 * | 12/2007 | Palumbo .................. C25D 7/00 428/457 |
| 2013/0186304 A1 * | 7/2013 | Pabla ..................... C23C 24/04 427/446 |

FOREIGN PATENT DOCUMENTS

| | | |
|---|---|---|
| WO | 2008071922 A1 | 6/2008 |
| WO | 2009077524 A2 | 6/2009 |

OTHER PUBLICATIONS

International Search Report for PCT/AU2013/000920 dated Nov. 28, 2013.
European Search Report dated Mar. 1, 2016 for corresponding EP Application No. 13830257.5.

* cited by examiner

FORMATION, REPAIR AND MODIFICATION OF LAY UP TOOLS

RELATED APPLICATIONS

The present application is a Divisional of U.S. patent application Ser. No. 14/414,534, filed on Jan. 13, 2015, which is a U.S. National Stage Application under 35 USC 371, claiming priority to PCT Serial No. PCT/AU2013/000920, filed on Aug. 20, 2013; which claims priority to Australian Patent Application Serial No. 2012903586, filed on Aug. 20, 2012, Australian Patent Application Serial No. 2012903587, filed on Aug. 20, 2012 and Australian Patent Application Serial No. 2012903588, filed on Aug. 20, 2012, the entirety of all of which are incorporated herein by reference.

FIELD OF THE INVENTION

The present invention relates to lay up tools useful in the manufacture of composite materials, to processes for making such tools and/or faceplates for such tools, and to castable compositions useful in the making of such tools. In a particular aspect, the invention relates to the repair and/or modification of the faceplates of lay up tools. The invention is believed to have particular utility in relation to lay up tools employed to produce composite components for use in the aerospace and automobile industries.

BACKGROUND OF THE INVENTION

Fibre-based composite components, for example for use in the aerospace industry, are typically made by moulding a fibre-reinforced composite material on a lay up tool followed by curing of the material on the tool at elevated temperature (normally up to about 200° C.) and under vacuum. After curing, the composite material is allowed to cool and then removed from the tool, and the tool is prepared for re-use. During this process, the thermal expansion of the tool must be minimised to ensure minimal deformation of the composite component being produced.

The surface of the lay up tool that contacts the composite material is called a faceplate (or working surface or tooling surface) and this is required to be highly precise and designed to close tolerances. As manufacture of composite components on the lay up tool involves high temperature curing, the working surface must also exhibit minimal dimensional change if high precision composite structures are to be produced repeatedly. The working surface must therefore be formed of a material having a low coefficient of thermal expansion. By way of example, the faceplate may be formed of specially selected nickel alloys or iron-based nickel-containing alloys. Invar 36 is one alloy that is commonly used. Invar 36 is a 36% nickel-64% iron alloy having a rate of thermal expansion approximately one-tenth that of carbon steel at temperatures up to 400° F. (204° C.).

Typically, the current process for the production of a faceplate involves machining a monolithic block of a suitable material (such as Invar 36) to provide a faceplate having the shape and size required for the composite part being produced. However, this approach is very wasteful as material is reduced to swarf during the machining process. Additionally, once formed, the faceplate must then be secured (typically by welding) to a rigid structure (often termed an "egg crate") that provides support to the faceplate. This process can be somewhat involved and labour intensive. For compatibility reasons, the support is typically also made of the same material as the faceplate.

Lay up tools can be sizeable, especially in the aerospace industry where it is desired to produce large composite structures, and in this context the tools are particularly expensive to manufacture. The cost is mitigated somewhat by the fact that the tools are re-useable, but it would be desirable to minimise usage and wastage of expensive materials such as Invar 36.

Against this background it would be desirable to provide an alternative form of lay up tool that may be produced with relative ease, that reduces consumption of expensive materials and that, at least in one or more embodiments, provides at least the same level of performance when manufacturing composite components as tools produced by the conventional process described above.

Thermal cycling experienced by a lay up tool over its lifetime can lead to crack formation in the faceplate of the tool. Engineers sometimes also require modification of the original tool design in order to vary the shape of composite component being produced. This may be achieved by addition of material to the faceplate of the tool, Currently, with lay up tools used in the manufacture of composite components, faceplate repair and modification is carried out by a welding process in which a region of the faceplate and material to be applied to it are melted and fused together using an arc-based welding system or laser. This approach is not ideal however because a heat affected zone is formed at the weld/faceplate interface. This zone does not have the same microstructure and properties as the faceplate and in turn this can cause dimensional instability when the tool is used repeatedly because of the thermal cycling that the tool is subjected to.

There is therefore the need to provide an alternative process for the repair and modification of a faceplate of a lay up tool for the manufacture of fibre-reinforced composites.

SUMMARY OF THE INVENTION

Accordingly, in a first aspect, the present invention provides a composite lay up tool comprising a metal faceplate on a support member, wherein the metal faceplate has been formed by cold-gas dynamic spraying of particles of the metal and wherein the support member is compatible with the faceplate and comprises a casting of a ceramic composition.

In a second aspect, the present invention provides a process for producing a composite lay up tool that comprises a metal faceplate on a support member compatible with the faceplate, which process comprises forming the metal faceplate by cold-gas dynamic spraying of particles of the metal onto a substrate and forming the support member by casting of a ceramic composition.

The present invention also provides, in a third aspect, a castable ceramic composition comprising a binder and an aggregate component mixable with water to form a slurry ready for casting, wherein the aggregate component is one of, or a mixture of, fused silica and a particulate metal alloy, and the binder and aggregate component are present in the proportions 10-50 wt % and 90-50 wt % based on the dry weight of the composition.

The present invention also provides the use of a composite lay up tool in accordance with the invention in the manufacture of a composite component.

The invention further provides, in a further aspect, a process for producing a faceplate for a lay up of tool, which process comprises cold-gas dynamic spraying of particles of a nickel-iron alloy onto a substrate to form a faceplate of the nickel-iron alloy on the substrate, the faceplate being of a thickness in the range 2 to 10 mm.

In a fifth aspect, the invention still further provides a process for depositing a metal on a faceplate of a lay up tool in which the faceplate is formed of a nickel-iron alloy, which process comprises preparing an area of a surface of the faceplate to effect cleaning and conditioning of the area to accept and adhere to cold-gas dynamic sprayed particles and cold-gas dynamic spraying particles of the metal onto the cleaned and conditioned area, wherein the metal is a nickel-iron alloy selected to be compatible with the faceplate.

Herein the term "metal" is intended to embrace metals per se and metal alloys. Typically, however, the invention will be implemented using a metal alloy for forming, repairing or modifying the faceplate.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

BRIEF DESCRIPTION OF THE DRAWINGS

Embodiments of the present invention are illustrated with reference to the accompanying non-limiting drawings in which.

DETAILED DESCRIPTION OF THE EMBODIMENTS OF THE INVENTION

Figure 1:
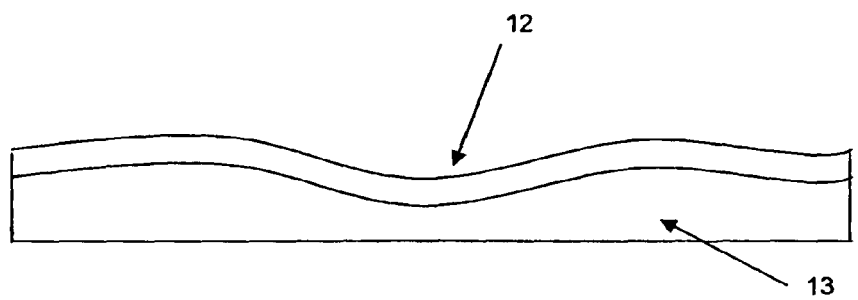
FIG. 1 is a schematic side elevation of a lay up tool according to an embodiment of the first aspect of the invention.

FIG. 1 illustrates an embodiment of lay up tool according to the first aspect of the invention, comprising a profiled metal faceplate 12 on a support member 13. The faceplate is composed of particles of the metal assembled by cold-gas dynamic spraying, while the support member 13 is a casting of a ceramic composition.

As mentioned, faceplate 12 is formed by cold-gas dynamic spraying of metal particles. As will be explained in more detail below, the nature of the support member 13 may vary depending upon the order in which the individual components of the composite lay up tool are produced.

Cold-gas dynamic spraying (also referred to herein as cold-gas spraying or simply as cold spraying) is a known process for applying coatings to surfaces. In general terms the process involves feeding (metallic and/or non-metallic) particles into a high pressure (typically >30 bar), gas flow stream which is then passed through a converging/diverging nozzle that causes the gas stream to be accelerated to supersonic velocities. The particles are then directed on to a surface to be coated. The process is carried out at relatively low temperatures, below the melting point of the particles and the substrate to be coated, with a coating being formed as a result of particle impingement on the substrate surface. The fact that the process takes place at relatively low temperature allows thermodynamic, thermal and/or chemical effects on the surface being coated and on the particles making up the coating to be reduced or avoided. This means that the original structure and properties of the particles can be preserved without phase transformations etc that might otherwise be associated with high temperature coating processes such as plasma, HVOF, arc, gas-flame spraying or other thermal spraying processes. The underlying principles, apparatus and methodology of cold-gas dynamic spraying are described, for example, in U.S. Pat. No. 5,302,414.

The cold-gas dynamic spraying process by which the faceplate is formed may be automated and offers great flexibility with respect to implementation especially when large tools are involved.

The metal employed to form the faceplate of the lay up tool is preferably selected for its suitability in the production of composite components. One important property that contributes to such suitability is low thermal expansion coefficient, for example in the range 0.6-1.9 µm/° C. up to 200° C.

The faceplate will typically be formed of a metal alloy, such as a nickel alloy or an iron-based nickel containing alloy. Alloys that are suitable for faceplates are well known in the art. By way of example, the metal alloy may be a nickel-iron alloy containing from 30-50 wt % nickel, such as from 36-42 wt % nickel. Invar 36 (Ni 36 wt %, Fe 64 wt %) is a preferred material to use.

Usually, the particle size of the metal alloy cold sprayed will range from 5 to 50 µm, for example from 8 to 30 µm, with a $D_{50}$ particle size of about 20 µm. Particles useful in the process of the invention are commercially available (for example from ESPI Metals, Ashland, Oreg. USA 97520). The sprayed particles may be spherical, non-spherical regular shaped or irregularly shaped, but spherical shape is preferred.

The faceplate thickness is typically 2-10 mm.

The operating parameters for the cold spraying process may be manipulated in order to achieve a faceplate having desirable properties. Operating parameters that may be varied include temperature, pressure, stand-off (distance between cold spray nozzle and faceplate surface), and spray angle. The particle size and morphology may also be varied. Upon impact of particles on a substrate during cold spraying the particles plastically deform and bond to the substrate and to each other. The amount of particle deformation will vary depending on the velocity of impact, particle size and shape, substrate and particle materials.

The apparatus used for cold spraying is likely to be of conventional form, and such equipment is commercially available. In general terms the basis of the apparatus used for cold spraying will be as described and illustrated in U.S. Pat. No. 5,302,414. It may of course be necessary to modify the apparatus, for example, when it is desired to apply the cold spraying process to a large workpiece. However, the process principles remain unchanged.

The support member 14 is cast from a ceramic composition. In the composite lay up tool of the invention the support member and faceplate are preferably in contact with each other or in very close proximity to each other, and it is highly preferred that, in at least a selected temperature range (e.g. 150-250° C.) the support member has the same, or essentially the same, i.e. similar, (±15%), thermal expansion coefficient as the metal in which the faceplate is formed. Matching of the thermal expansion coefficient of the support member to the faceplate is intended to minimise dimensional instability and associated stresses in the composite tool when the tool is subjected to thermal cycling as occurs during use. It is highly preferred that the lay up tool retains its original dimensions and tolerances to ensure consistency in the composite components produced by use of the tool.

In an embodiment of the invention the ceramic composition comprises a suitable binder, such as cement, e.g. Portland cement, and an aggregate component that enables matching of the thermal expansion coefficient of the (cast) support member to the faceplate. The ceramic composition should also provide a support member that is sufficiently strong and resilient to provide stable support to the faceplate and composite material being moulded on the lay up tool. In an embodiment of the invention the aggregate may be fused silica. In another embodiment the aggregate may be a metal e.g. metal alloy, that is the same as or similar to (in terms of relevant properties) to the metal used for the faceplate. When the aggregate is a metal alloy, this may take the form of what would otherwise be waste material, for example swarf. In an embodiment of the invention the aggregate component comprises a nickel iron alloy such as Invar 36, which is well suited to formation of a faceplate of the same metal alloy.

As a general guide, the amount of binder (e.g. cement) is typically 10 to 50 wt % and the amount of aggregate is 50-90% based on the dry weight of the composition. The binder and aggregate component may be mixed with water to form a castable slurry. The amount of water used is typically 5-20 wt %. After mixing with water the composition is in a form ready to be cast, after which the composition is allowed to set/cure. The time taken for the composition to set will vary but is typically a number of days, for example 5-7 days. Setting involves an exothermic reaction and the extent of setting can be followed by monitoring the temperature of the composition. After setting has been completed, the cast composition can then be subjected to hot air drying. This is usually carried out at a temperature of up to about 100° C. This step can take a number of hours and is usually undertaken until no further weight change exists at 100° C. It may also be necessary to subject the cast composition to a final sinter at a temperature of up to about 250° C. over a period of a few hours to drive off all traces of moisture.

It should be noted that air bubbles in the cast composition can act as stress concentration points and it is therefore desirable to minimise the amount of air that will be trapped in the cast composition. This can be done by formulating the composition for casting under vacuum, pouring the composition slowly when casting and/or vibrating the composition immediately after casting (by vibration of the mould in which the composition is cast).

It should also be noted that the cast composition may be subject to hygroscopic degradation and it is important therefore to carry out regular checks on the integrity of the cast composition.

The composite lay up tool may take a variety of forms each involving a different sequence of formation steps. In one embodiment the support member is produced using a suitably shaped mould. Once produced the support member can be shaped (by machining or water jet cutting) to produce a desired surface profile. A faceplate may then be developed by cold spraying of metal particles onto the shaped surface of the support member. FIG. 1 illustrates an exemplary lay up tool thereby produced. Typically, the dimensions of the faceplate as-produced will exceed specification and the faceplate is then finished by machining to achieve the desired dimensions and tolerances.

In a related embodiment the support member may be a modular structure made up of a number of pre-formed units. Each unit is formed by casting from a ceramic composition as described, with the units then being joined together using fasteners and the like to form a modular structure. This approach may provide more flexibility in terms of manufacturing and design of the support member. An exemplary modular support member is shown schematically in FIG. 2.

In another embodiment for producing a lay up tool as depicted in FIG. 1, the faceplate is formed first by cold spraying of metal alloy particles on to a suitably shaped pre-formed mould. The mould defines the intended surface profile of the faceplate and is typically made of aluminium or steel. After production of the faceplate, the support member is formed by casting of ceramic composition on to the faceplate. For dimensional stability it may be desirable to maintain the faceplate in contact with the mould used for its formation during casting and subsequent steps in forming the support member. A surrounding mould having suitable wall members will be needed during casting of the ceramic composition. After the support member has been formed, the faceplate is then separated from the mould. This may be done by machining of the mould away from the faceplate, or it may be possible to chemically dissolve the mould material. For example, an aluminium mould may be dissolved using sodium hydroxide. Of course, care must be taken during this step to ensure that the faceplate is not compromised. Surface finishing of the faceplate (by machining) is generally undertaken.

In another embodiment, the support member (possibly modular in nature) and faceplate are each produced independently and then joined together subsequently. In this case the support member may be formed by simple moulding and the faceplate formed by cold spraying of metal alloy particles onto a suitable mould or other substrate with the mould or substrate subsequently being removed.

In an embodiment of the invention bonding between the support member and faceplate may be enhanced by the use of anchors that are attached to the faceplate and that extend into the support member. These anchors may be produced by cold spraying on the surface of the faceplate or anchors may be attached to the faceplate by conventional means such as by screwing or welding. When the anchors are formed on or attached to the faceplate, the ceramic composition will subsequently be cast over the anchors. This process is explained in more detail with reference to FIGS. 3 to 6.

Figure 2:
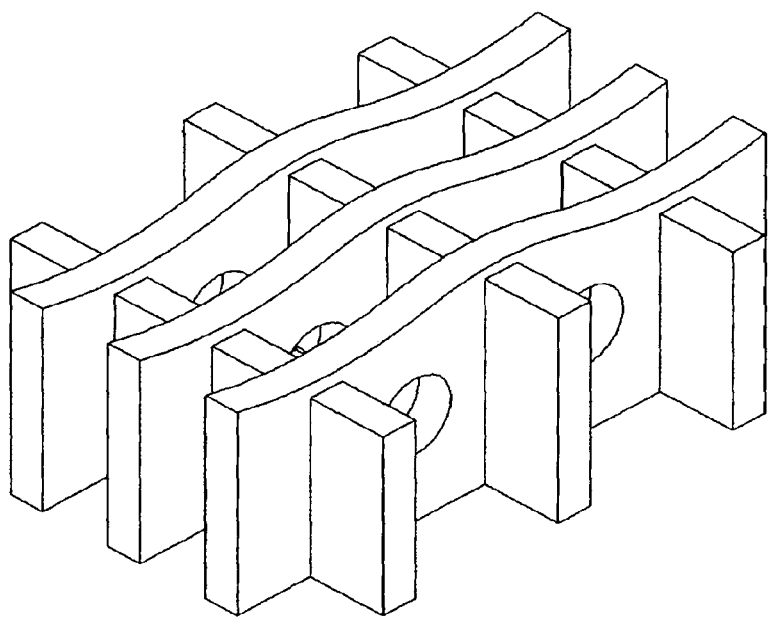
FIG. 2 is a schematic showing a modular support member (egg-crate) for another embodiment of lay up tool according to the first aspect of the invention.
Figure 3:
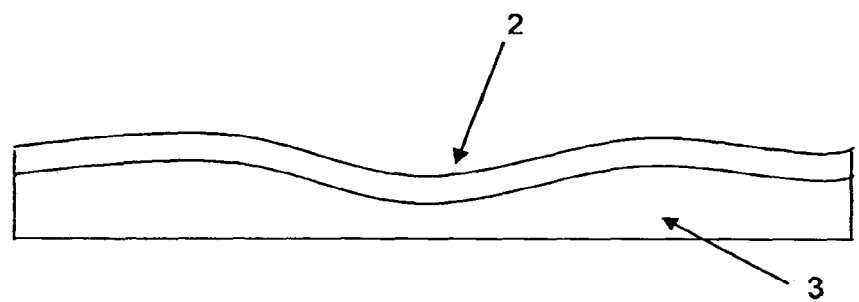
FIGS. 3 to 6 are schematics illustrating successive steps in the formation of a composite lay up tool in accordance with a further embodiment of the present invention.

FIG. 2 shows a layer of metal alloy (2) (e.g. Invar 36) that has been applied to a mould (3) (e.g. aluminium or steel) by cold spraying, to form a faceplate. The mould (3) has a desired surface profile.

Figure 4:
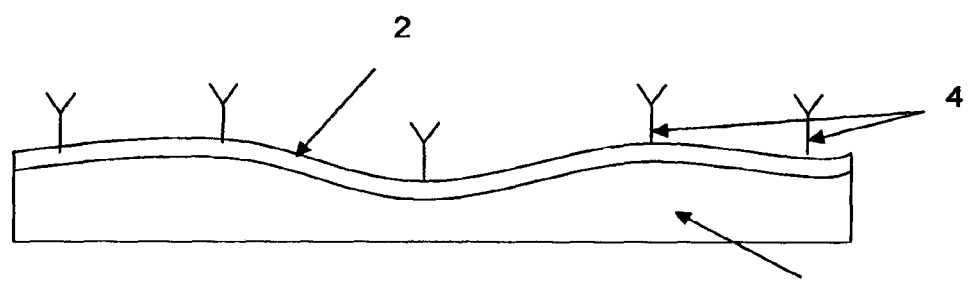

In the step depicted in FIG. 4, a series of Y-shaped anchors (4) are attached (e.g. by cold spraying, screwing or spot welding) to the surface of the faceplate (2) remote from the mould. It will be appreciated that this surface is the underside of the faceplate (2) in the subsequent tool. The anchors (4) are typically formed of the same material as the faceplate to avoid any dimensional instability during thermal cycling of the lay up tool.

Figure 5:
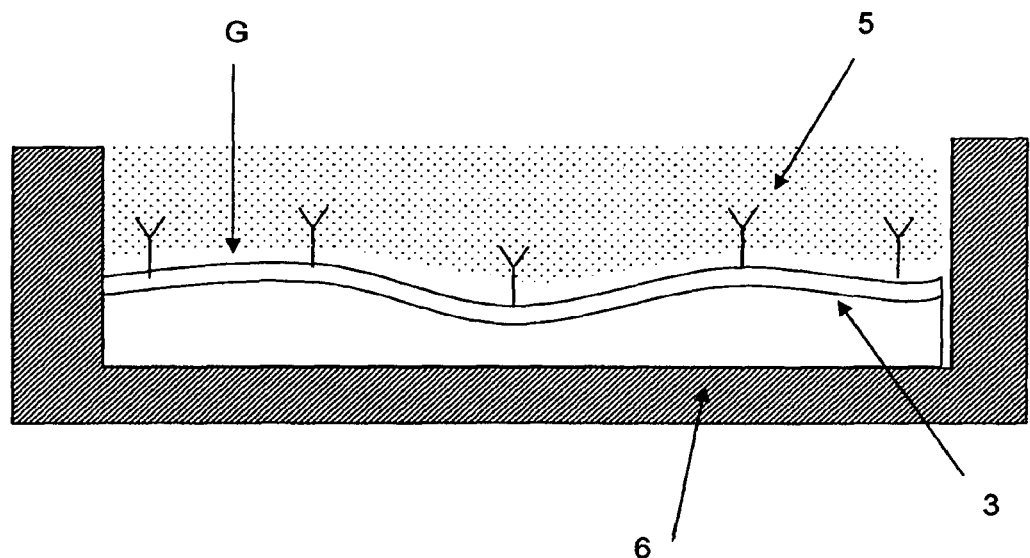
Figure 6:
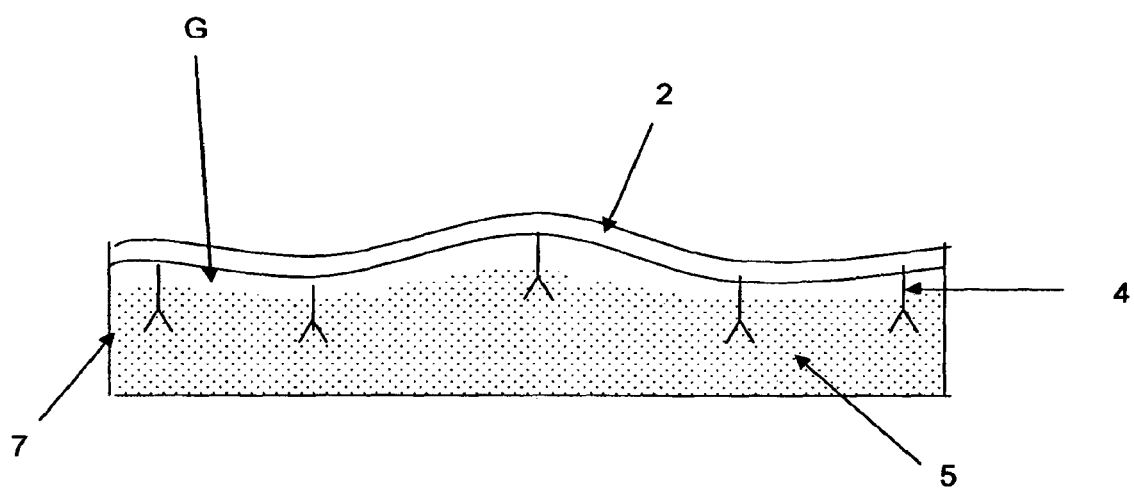

FIG. 5 shows the next step in the process in which a suitably selected ceramic composition (5) is poured into a mould (6) and over the anchors (4). The ceramic composition (5) is then allowed to set and dried. The surrounding mould (6) is then taken away and the mould (3) used for forming the faceplate (2) removed, by machining or by chemical dissolution. The composite lay up tool as-produced is shown in FIG. 6. Surface finishing of the faceplate (2) will be undertaken before the tool is used for composite production.

In a related embodiment, the anchors may be embedded in the ceramic composition during casting with a portion of each anchor extending from the surface of the casting. After suitable shaping of the surface of the casting, a faceplate can then be developed by cold spraying. The anchors will become embedded in the faceplate during cold spraying.

In another embodiment of the invention the composite lay up tool preferably has an air gap (G) (FIGS. 5 and 6) extending between the support member and faceplate. This air gap (G) may be beneficial in terms of buffering heat transfer between the faceplate and support member during manufacture of composite materials on the faceplate. This air gap (G) is usually of uniform dimension over the area of the tool, and may be up to 30 mm to allow space for vacuum lines and other services for the tool assembly This air gap (G) may be formed by a modification of the production process illustrated in FIGS. 3 to 6. Thus, prior to casting of the ceramic composition (FIG. 5) a layer of sacrificial material (typically a polymer such as polystyrene) is provided over the surface of the faceplate upon which the ceramic composition is to be cast. After casting, drying etc, to, produce the support member, the sacrificial material can be removed (e.g. it can be dissolved with suitable chemical or burned off at elevated temperature). This leaves an air gap (G) between the support member and faceplate, with the faceplate being supported by the anchors embedded in the support member. It may be possible to achieve the air gap (G) with modification to the other production processes described. FIGS. 5 and 6 show this air gap but it will be appreciated that the invention may be implemented without the air gap and these figures should be understood accordingly.

It has been found that cold-gas spraying enables metal to be deposited on the surface of a nickel-iron faceplate, e.g. of Invar 36, by a solid-state deposition process in which the deposited metal can exhibit material properties that are the same as, or suitably the same as, the original faceplate. In this context the expression "suitably the same" means that the deposit may not be identical to the original faceplate in microstructure and properties but minor differences may be tolerated provided they do not adversely impact performance of the lay up tool.

It is important to the repeated use of the faceplate that the deposited material retains the same, or suitably the same, chemistry and thermal expansion coefficient of the material from which the faceplate was originally formed. Moreover, it has been found that the metal deposited by cold spray is of low residual stress and presents no undercut issues at the deposit/substrate interface which would otherwise have potential to cause cracking. As before, the cold-gas spraying process may be automated and offers great flexibility with respect to implementation especially when large tools are involved. The faceplate to be treated by the repair or modification process of the invention does not require pre-heating before cold spraying and the low temperature regime involved avoids oxide formation in the deposited metal. The result is improved product quality.

In one embodiment the modification of the faceplate involves repairing a defect in a faceplate. The defect may be a crack produced by thermal cycling during use of the faceplate, a worn/eroded area, or an indentation or other form of mechanical damage on the faceplate surface. In accordance with this embodiment the present invention provides a process for repairing a defect on a nickel-iron faceplate of a lay up tool, which process comprises cold gas dynamic spraying of particles of a compatible nickel-iron alloy over the defect. According to this embodiment, a defect on a faceplate can be remediated so that original surface design and finish can be achieved.

In this embodiment the preferred approach is to deposit metal over the defect and a small area around the defect. This may assist the deposited material to form a strong bond to the faceplate. Prior to cold spraying the area to be treated will usually be prepared by machining, grit blasting, water jet blasting and the like, so that the area is suitably clean and conditioned to receive cold sprayed particles. If the area to be treated is not suitably clean or includes loose matter or debris, adhesion of cold spray particles may be impaired. If the defect is a crack or similar, the faceplate is machined to form a recess that eliminates and replaces the crack.

Usually, the repair involves cold spraying of metal such that the original dimensions of the area being repaired are exceeded. Subsequently, the area can be machined to restore original dimensions and tolerances, for example by milling or grinding.

Figure 7:
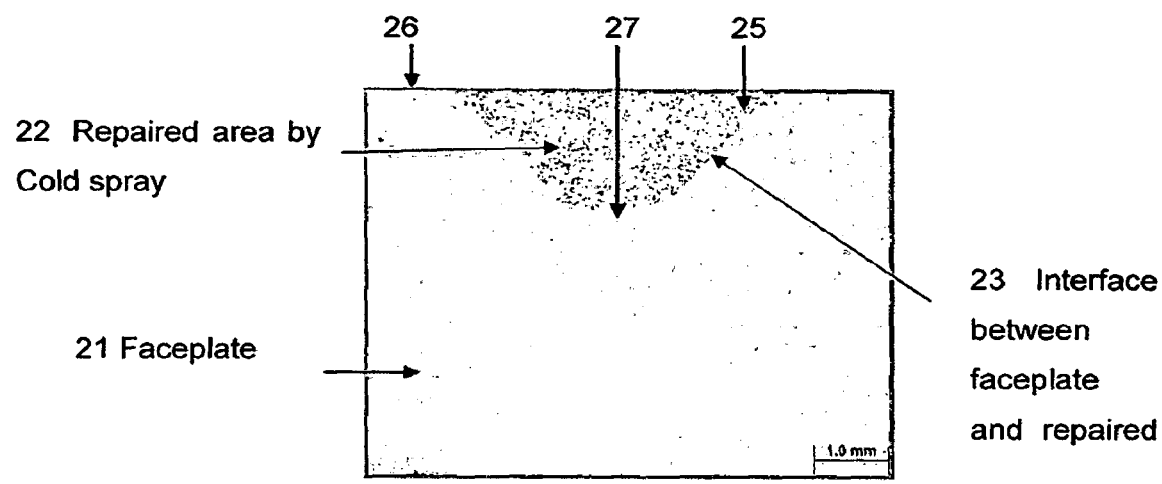
FIG. 7 is an optical image of a cross-sectioned Invar 36 faceplate repaired according to an embodiment of the fifth aspect of the invention.

FIG. 7 shows an Invar 36 faceplate (21) that has been repaired using cold spray. A pit on the surface of the faceplate has been filled (22) by cold spraying of metal alloy particles. There is an interface (23) between the original faceplate material (21) and the deposited metal (22) but this does not create dimensional instability since there no localised heating at the interface that will lead to formation of a heat affected zone or distortion of the tool. There are no undercuts at the substrate/deposit interface (usually associated with weld repairs). Cold spray deposits are also vacuum tight which is an important property for composite part manufacture. It will be seen in FIG. 7 that the prepared area in a recess defined by surfaces that later form the aforesaid interface (23). These interfaces include a flat broad conical surface (25) inclined at no greater than 45° to the adjacent unprepared faceplate surface (26), and a curved or concave bottom (27) of a radius similar to or larger than the depth of the recess. This facilitates successful depositing and adhesion of the sprayed particles.

In another embodiment of this aspect of the invention cold spraying may be used to add a (new) structure to, or modify an existing structure of, a faceplate in order to change its overall surface design. This may be necessary when it is desired to produce a composite of different design without needing to incur the cost of producing a new faceplate. In this embodiment the present invention provides a process for modifying (or re-designing) a faceplate of a lay up tool, which process comprises depositing a compatible metal onto the faceplate in a desired configuration.

Prior to cold spraying the area of the faceplate to be modified will normally be prepared, for example as described above. Usually, the deposited (structure) produced by cold spraying will have width dimensions in excess of what is actually required. Machining (e.g. milling or grinding) may then be carried out to obtain the desired dimensions and tolerances.

The metal alloy that is deposited by cold spraying is referred to as being a "compatible metal alloy". What this means is that once deposited on a faceplate the metal alloy behaves the same as, or suitably the same as, the metal alloy of the faceplate with respect to those key characteristics that impact on performance of the faceplate as a lay up tool. One very important characteristic is thermal expansion coefficient. Here the metal alloy for cold spraying has the same, or essentially the same (±5%), thermal expansion coefficient as the metal alloy from which the faceplate is formed. Preferably, the metal alloy that is cold sprayed is the same metal alloy used for the faceplate. Thus, if the faceplate is made of Invar 36, the metal alloy for cold spraying is also Invar 36.

As with earlier described aspects of the invention, the particle size of the metal alloy to be cold sprayed will range from 5 to 50 µm, for example from 8 to 30 µm, with a $D_{50}$ particle size of about 20 µm. Particles useful in the process of the invention are commercially available (for example ESPI Metals, Ashland, Oreg. USA 97520). The sprayed particles may be spherical, non-spherical regular shaped or irregularly shaped but spherical shape is preferred.

In an embodiment of the invention a surface preparation technique has been developed that achieves enhanced adhesion of cold sprayed particles to a faceplate formed in a nickel-iron alloy. The technique involves preparing the area to be cold sprayed so that it has a repeating pattern of grooves (or channels). Noting the particle size referred to above for the particles to be deposited by cold spraying, the grooves preferably have an aspect ratio (pitch:depth) in the range 4:1 to 9:1. The grooves may be formed by machining and may have a variety of cross-sectional shapes (e.g. V-shaped, U-shaped or rectangular). As a general guide the pitch is typically 0.1 to 1.0 mm, preferably from 0.3 to 0.9 mm. The presence of the grooves is believed to increase interlocking of cold sprayed particles with the substrate thereby increasing the overall bond strength of the surface modification.

Figure 8:
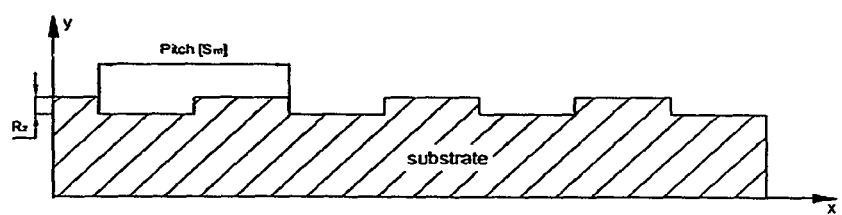
FIG. 8 is a diagram showing a surface profile of an Invar 36 faceplate that has been prepared for cold-gas dynamic spraying in accordance with an embodiment of the fifth aspect of the present invention.

FIG. 8 is a schematic showing a surface prepared for cold spraying in accordance with this embodiment. The pitch ($S_m$) is measured as a repeat unit overt the surface. The groove depth is denoted $R_z$.

It is highly preferred that the particles that are cold sprayed adhere strongly to the faceplate and that the deposited material is dense and defect-free. The operating parameters for the cold spray process may be manipulated in order to achieve a deposit having desirable properties. Operating parameters that may be varied include temperature, pressure, stand-off (distance between cold spray nozzle and faceplate surface), and spray angle. The particle size and morphology may also be varied. Upon impact of particles on the faceplate the particles plastically deform and bond to the surface of the faceplate and to each other. The amount of particle deformation will vary depending on the velocity of impact, particle size and shape, substrate and particle materials.

As with earlier described aspects of the invention, apparatus used for cold spraying is likely to be of conventional form, and such equipment is commercially available. In general terms the basis of the apparatus used for cold spraying will be as described and illustrated in U.S. Pat. No. 5,302,414. It may of course be necessary modify the apparatus, for example, when it is desired to apply the cold spray process to a large work piece. However, the process principles remain unchanged.

Embodiments of the present invention are illustrated with reference to the following non-limiting examples.

Example 1—Properties of Materials

Details of the raw materials used for the experimental work are shown in Table 1

TABLE 1

Details of materials Used for CTE measurements

| Materials | Supplier | Specification |
|---|---|---|
| Wrought Invar 36 Specimen | Commercial available Invar block 36 | Fe: 64% Ni: 36% |
| cold sprayed Invar 36 specimen | ESPI metals | Fe: 64% Ni: 36% |
| Portland cement | Australian Builders | Ecoblend, type GB |
| Invar machining swarf | Swarf obtained from client after machining wrought Invar 36 | 0.425-4 mm |
| Fused silica granules sand | Linyi Agrishine Import & Export Co. Ltd. | 5-10 mm Dia. 0-1 mm Dia |

1. Compositions

The compositions of the composite specimens are shown in Table 2.

TABLE 2

Compositions of Specimens Prepared for CTE measurements

| | Wt % | |
|---|---|---|
| Raw materials | Invar swarf composite | Fused silica composite |
| Cement | 32.45 | 14.29 |
| Invar swarf | 67.55 | 0 |
| Fused silica lumps | 0 | 57.14 |
| Fused silica sand | 0 | 28.57 |
| Total | 100 | 100 |
| Water (parts) | 10 | 8.9 |

Method for Preparation of CTE Test Samples for Invar 36 Swarf and Fused Silica Composites The solid parts of the composite were dry mixed in a beaker using a spatula.

Water was added gradually and thoroughly mixed.

The slurry was poured into a steel mould and vibrated for 5 minutes.

The mould was placed in a plastic bag and sealed to retain the moisture during curing After minimum of 6 days of curing at room temperature, the block was removed from the mould Test specimens 10×10×25 mm were machined from the dried composite block.

2. Thermal Expansion Coefficient (TEC) Measurements

Test specimens were dried at 100° C. overnight in an oven before commencing CTE measurements. Details of specimens are shown in Table 3, and test results in Table 4.

TABLE 3

Details of the specimens for TEC measurement

| Specimen | Specimen size (mm) | density | Remarks |
|---|---|---|---|
| Wrought Invar | 10 × 11 × 25 | 7.89 (measured) | |
| Cold sprayed Invar | 10 × 10 × 25 | ≈8.1 | |
| Invar swarf composite | 10 × 10 × 25 | 3.65 | |
| Fused silica composite | 11.1 × 11.3 × 25.7 | 2.0-2.2 | Density of the fused silica: 2.2 |

The CSIRO Dialtronic 6548 (Theta industries Inc) was used to measure the thermal expansion coefficient CTE of the specimens. Sample sizes were 10 high×10 wide×25 mm long. The Temperature range was from room temperature to 250° C. The heating rate was 5° C./min, and the atmosphere air.

The results are set out in Table 4.

TABLE 4

TEC Measurements

| Material | Thermal expansion coefficient (CTE) ($\mu$m/m-° C.) | | |
|---|---|---|---|
| | 100° C. | 150° C. | 200° C. |
| *Commercial wrought Invar 36 | 1 | 1.2 | 1.8 |
| *Cold sprayed Invar | 0.3 | 0.7 | 1.6 |
| *Composite Invar Swarf | 0.3 | 0.5 | 0.9 |
| *Composite Fused Silica | 1.9 | 1.4 | 0.6 |

Example 2—Manufacture of Aerospace Tooling Materials

Castable ceramic compositions which have a similar or lower thermal expansion coefficient as that of Invar 36 have been developed. The ceramic composition comprises cement with Invar 36 swarf and/or fused silica as aggregate(s.). The thermal expansion coefficient of the cast composition (cement+Invar 36 aggregate, cement+fused silica aggregate and cement+Invar 36 aggregate+fused silica aggregate) were found to match the thermal expansion coefficient of wrought cast Invar 36.

The ceramic composition was formed by mixing cement with either Invar 36 swarf and/or fused silica aggregate. The mixing ratio of cement was 10-50 wt % with 50-90 wt % Invar 36 aggregate. Other materials can be added to the Invar 36 composite mixture or alternatively materials such as fused silica (5-20 wt % based on the dry weight of components) can replace a portion of the Invar 36 material to achieve tools with low coefficient of thermal expansion.

Prior to wet mixing the components were dry-mixed together using a tumbler machine for 0.5 hours followed by water addition of 5-20 wt %. The slurry mixture was then poured into a tool mould having the desired shape and vibrated for 5-30 minutes to remove any air bubbles (porosity) formed in the slurry. The slurry material in the mould was cured at room temperature for a minimum of 0.6 days. After curing the material was removed from the mould to reveal a monolithic piece. To achieve the final support member properties further drying was carried out overnight in an oven at 100° C. followed by firing up to 250° C. for 1 hour. The faceplate surface can then be produced on the surface of the support member by cold spraying of particles of Invar 36, or by surface coating with other coating materials prior to the production of carbon composite parts as described in Example 3.

Example 3—Manufacture of Face-Plate Tooling

Invar 36 deposits were obtained using a commercial CGT Kinetics 4000 series Cold spray system with a tungsten carbide MOC De Laval nozzle and nitrogen as propellant gas. The gun was equipped with a short pre-chamber tube. Gas pressures of 3.8 MPa with gas temperatures 800° C. were used. The standoff distance was kept constant at 30 mm while the traverse speed was 1 m/s with overlapping passes of 2.0 mm. Following Cold spray application the Invar 36 deposit were machined to the same surface datum as the faceplate.

Suitably selected ceramic compositions were cast into moulds and shaped to provide a surface with desired profile. The surface was then sealed by cold spraying of particles of Invar 36. Other materials, including ferrous metals and in some cases non-ferrous metal powder (e.g. Ni, Al powder) may alternatively be used. The cold sprayed surface can be final machined or polished to the desired tolerance. It is necessary to finish all cold spray deposits by machining and/or polishing to maintain dimensional tolerance.

Example 4—Repair or Modification of Invar 36 Faceplate

Figure 9:
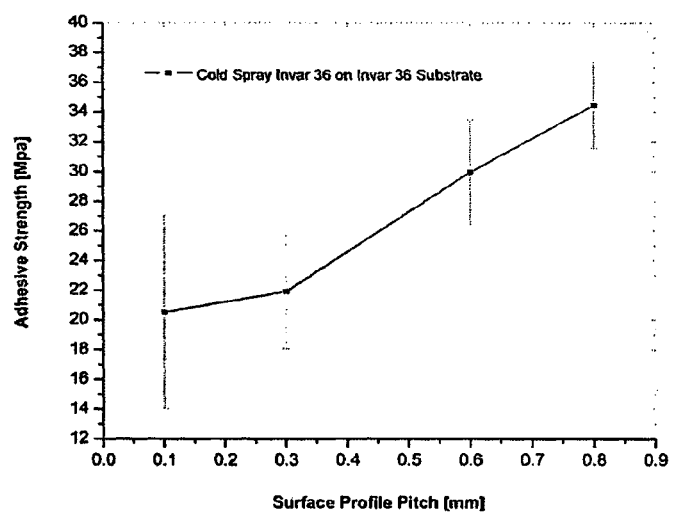
FIG. 9 is a graph showing the relationship between the adhesive strength of Invar 36 Cold sprayed onto an Invar 36 faceplate and the pitch of the surface profile of the substrate formed according to FIG. 8 prior to cold spraying.

To enhance the bond strength of cold sprayed Invar 36 deposits on existing Invar 36 tooling, a surface preparation technique has been developed which involves surface profiling the substrate using conventional machining to form a particular pattern on the surface, as illustrated in FIG. 8. The method increases the cold sprayed particle interlocking with the substrate thereby improving the overall bond strength of the repair or modification. By maintaining an average aspect ratio from 4 to 9 with respect to pitch and depth, the bond strength is proportional to the pitch used. Bond strengths increased more than 70% from approximately 20 MPa to approximately 34 MPa when the pitch profile was increased, (FIG. 9).

Invar 36 deposits were obtained using a commercial CGT Kinetics 4000 series cold spray system with a tungsten carbide MOC De Laval nozzle and nitrogen as propellant gas. The gun was equipped with a short pre-chamber tube using gas pressures of 3.8 MPa with gas temperatures 800° C. The standoff distance was kept constant at 30 mm while the traverse speed was 1 m/s with overlapping passes of 2.0 mm. Following cold spray application to an Invar 36 faceplate, the cold sprayed Invar 36 deposit was machined to the same surface datum as the faceplate.

The invention claimed is:

1. A process for the repair and/or modification of the metal faceplates of lay up tools by depositing a metal on a metal faceplate of a lay up tool in which the metal faceplate is formed of a nickel-iron alloy, which process comprises:
  preparing an area of a surface of the faceplate to effect (1) cleaning and (2) conditioning of the area to accept and adhere to cold-gas dynamic sprayed particles of metal, and
  cold-gas dynamic spraying particles of the metal onto the cleaned and conditioned area of the surface of the faceplate,
  wherein the particles of metal are a nickel-iron alloy selected to be compatible with the metal faceplate, and wherein said conditioning includes at least one of:
  roughening said area of the metal faceplate surface; or
  forming a repeating pattern of grooves in said area of the metal faceplate surface.

2. A process according to claim 1, wherein the grooves have an aspect ratio (pitch:depth) in the range 4:1 to 9:1, and the pitch of the groove pattern is in the range 0.1 to 1.0 mm.

3. A process according to claim 1, for repairing a crack or other defect in the metal faceplate, wherein said area is of dimensions that exceed the dimensions of the crack or other defect and wherein the process includes machining the metal deposited onto the metal faceplate by cold-gas dynamic spraying to restore original dimensions and surface of the metal faceplate.

4. A process according to claim 1, wherein the prepared area itself is a recess defined by surfaces that are inclined no more than 45° to the adjacent unprepared metal faceplate surface and/or curved with a radius similar to or larger than the depth of the recess.

5. A process according to claim 1, wherein cold-gas dynamic spraying is used to add a new structure to, or modify an existing structure of, a metal faceplate in order to change its overall surface design.

6. A process according to claim 1, for repairing a defect on a nickel-iron faceplate of a lay up tool, which process comprises cold gas dynamic spraying of particles of a compatible nickel-iron alloy over the defect.

7. A process according to claim 1, wherein the nickel-iron alloy is Invar 36.

* * * * *